(12) United States Patent
Li

(10) Patent No.: US 12,328,344 B2
(45) Date of Patent: Jun. 10, 2025

(54) WIRELESS COMMUNICATION METHOD, CUSTOMER PREMISE EQUIPMENT, USER EQUIPMENT, AND NETWORK SIDE DEVICE

(71) Applicant: HUAWEI TECHNOLOGIES CO., LTD., Guangdong (CN)

(72) Inventor: Shuang Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 345 days.

(21) Appl. No.: 17/833,563

(22) Filed: Jun. 6, 2022

(65) Prior Publication Data

US 2022/0303315 A1    Sep. 22, 2022

Related U.S. Application Data

(63) Continuation of application No. PCT/CN2020/123911, filed on Oct. 27, 2020.

(30) Foreign Application Priority Data

Dec. 4, 2019 (CN) .......................... 201911228644.5

(51) Int. Cl.
*H04L 65/10* (2022.01)
*H04L 65/1016* (2022.01)
(Continued)

(52) U.S. Cl.
CPC ...... *H04L 65/1016* (2013.01); *H04L 65/1073* (2013.01); *H04W 68/005* (2013.01); *H04W 76/10* (2018.02)

(58) Field of Classification Search
CPC .......... H04L 65/1016; H04L 65/1073; H04W 76/10; H04W 68/005
See application file for complete search history.

(56) References Cited

U.S. PATENT DOCUMENTS

| 6,144,667 A * | 11/2000 | Doshi ................. H04Q 3/0045 370/401 |
| 2011/0105131 A1* | 5/2011 | Shaheen ............... H04W 76/14 455/445 |

(Continued)

FOREIGN PATENT DOCUMENTS

| CN | 104580781 A | 4/2015 | |
| CN | 105979502 A * | 9/2016 | .............. H04W 8/18 |

(Continued)

OTHER PUBLICATIONS

Huang Jia et al., Research on Carrier-Led VoWi-Fi Networking Solution. Telecommunications Technology , Feb. 2016, 12 pages.

(Continued)

*Primary Examiner* — Shukri Taha

(57) ABSTRACT

Embodiments of this application provide a wireless communication method, customer premise equipment CPE, user equipment UE, and a network side device. In the wireless communication method, a target bearer is used by the UE to perform VOWIFI service communication, and is a dedicated target bearer that is established by the network side device and that is used to transmit VOWIFI communication data. Then, the VOWIFI communication data of the UE may be transmitted by using the dedicated target bearer, to be specific, the CPE may parse and process the VOWIFI data of the UE into data that can be transmitted on the dedicated target bearer.

11 Claims, 8 Drawing Sheets

UE    CPE

Base station

(51) Int. Cl.
*H04L 65/1073* (2022.01)
*H04W 68/00* (2009.01)
*H04W 76/10* (2018.01)

(56) References Cited

U.S. PATENT DOCUMENTS

2018/0049275 A1   2/2018  Agarwal et al.
2018/0263068 A1*  9/2018  Chiang ............. H04W 36/0022

FOREIGN PATENT DOCUMENTS

| | | |
|---|---|---|
| CN | 109150687 A | 1/2019 |
| CN | 109792799 A | 5/2019 |
| CN | 110266576 A | 9/2019 |
| GB | 2561169 A | 10/2018 |
| WO | 2016180113 A1 | 11/2016 |
| WO | 2016180179 A1 | 11/2016 |
| WO | 2017016615 A1 | 2/2017 |
| WO | WO-2017185460 A1 * | 11/2017 ............ H04W 12/06 |
| WO | WO-2018000641 A1 * | 1/2018 ............. H04W 8/18 |
| WO | 2019186504 A1 | 10/2019 |

OTHER PUBLICATIONS

3GPP TR 36.746 V15.1.1 (Apr. 2018), 3rd Generation Partnership Project; Technical Specification Group Radio Access Network; Study on further enhancements to LTE Device to Device (D2D), User Equipment (UE) to network relays for Internet of Things (IoT) and wearables;(Release 15), 55 pages.

* cited by examiner

WIRELESS COMMUNICATION METHOD, CUSTOMER PREMISE EQUIPMENT, USER EQUIPMENT, AND NETWORK SIDE DEVICE

CROSS-REFERENCE TO RELATED APPLICATIONS

This application is a continuation of International Application No. PCT/CN2020/123911, filed on Oct. 27, 2020, which claims priority to Chinese Patent Application No. 201911228644.5, filed on Dec. 4, 2019. The disclosures of the aforementioned applications are hereby incorporated by reference in their entireties.

TECHNICAL FIELD

This application relates to the communication field, and in particular, to a wireless communication method, customer premise equipment, user equipment, and a network side device.

BACKGROUND

With the shutdown of the global system for mobile communications (GSM)/the universal mobile telecommunications system (UMTS), there are a large quantity of indoor coverage holes. At present, voice over wireless fidelity (VOWIFI) in voice over Internet Protocol (VOIP) is a fast and effective supplementary technology used for weak indoor coverage by an operator.

In the conventional technology, a VOWIFI service may be implemented through customer premise equipment (CPE). The CPE is a mobile signal access device that receives a mobile signal from a network side and forwards the mobile signal as a wireless Wi-Fi signal, and can convert a high-speed 4G signal or a high-speed 5G signal on the network side into a wireless fidelity (Wi-Fi) signal for communication with a terminal, that is, a connection between the terminal and the network side may be implemented by using the Wi-Fi signal. The CPE may be widely applied to wireless network access in rural areas, towns, hospitals, institutions, factories, residential areas, and the like. Therefore, costs of laying a wired network can be saved.

However, in this solution, an evolved packet data gateway (ePDG) network element needs to be deployed on the network side, and the terminal and the network side that are connected to the CPE need to be enhanced, to support implementation of this solution. This process is too complicated to implement popularization and application of a VOWIFI technology.

SUMMARY

Embodiments of this application provide a wireless communication method, customer premise equipment CPE, user equipment (UE), and a network side device, to implement transmission of VOWIFI data. Compared with the conventional technology in which an ePDG network element needs to be added to implement VOWIFI data transmission, a network element does not need to be added, and security and quality of service of voice service transmission are ensured through a dedicated target bearer.

A first aspect of embodiments of this application provides a wireless communication method. The wireless communication method may be applied to VOWIFI communication, to be specific, CPE may enable, by using the method, UE to access a network side device to implement VOWIFI communication, where the UE is connected to the network side device through the CPE. When the UE serves as calling UE in VOWIFI, the method performed by the CPE specifically includes: The CPE receives a call request message from the UE, and the CPE sends a bearer setup request message to the network side device based on the call request message, where the bearer setup request message indicates a request to set up a target bearer, and the target bearer is used by the UE to perform VOWIFI service communication; after the CPE receives a bearer setup response message sent by the network side device, the CPE sends a call response message to the UE; and the CPE transmits VOWIFI data of the UE on the target bearer. The target bearer is used by the UE to perform the VOWIFI service communication, and is a dedicated target bearer that is set up by the network side device and that is used to transmit VOWIFI communication data. Then, the VOWIFI communication data of the UE may be transmitted through the dedicated target bearer, that is, the CPE may parse the VOWIFI data of the UE into data that can be transmitted on the dedicated target bearer. Compared with the conventional technology in which an ePDG network element needs to be added to implement VOWIFI transmission, a network element does not need to be added, and security and quality of service of voice service transmission are ensured through the target bearer.

It should be noted that the target bearer is used by the UE to perform the VOWIFI service communication, and is a dedicated target bearer that is set up by the network side device and that is used to transmit the VOWIFI communication data. In a long term evolution (LTE) network, the target bearer may be a dedicated target bearer that is used by an LTE network side device to transmit voice over long term evolution (VOLTE) data. In a 5G new radio (NR) network, the target bearer may be a dedicated target bearer that is used by an NR network side device to transmit voice over new radio (VONR) data. In a 6G network or a more advanced network in the future, the target bearer may be a corresponding dedicated target bearer used to transmit VOIP data. This is not limited herein.

In a possible implementation of the first aspect of embodiments of this application, before the CPE receives a call request message from the UE, the method further includes: The CPE receives a registration message from the UE, and then, the CPE sends a registration response message to the UE, where the registration response message includes capability information of the CPE.

In this embodiment, the capability information of the CPE may include a network support capability of the CPE and/or an air interface channel condition of the CPE, so that the UE uses the capability information of the CPE as a basis for determining whether the CPE is used to transmit the VOWIFI data. To be specific, only when the UE determines that the capability information of the CPE meets a preset condition of the UE, that is, when the CPE can provide a high-quality voice data transmission service, the UE sends the call request message to the CPE to initiate voice calling. This ensures user experience when a user subsequently performs a voice service through the UE.

In a possible implementation of the first aspect of embodiments of this application, when the VOWIFI data of the UE is uplink VOWIFI data, the process in which the CPE transmits the VOWIFI data of the UE on the target bearer may include: The CPE receives initial uplink VOWIFI data sent by the UE; the CPE parses the initial uplink VOWIFI data to obtain target uplink VOWIFI data; and the CPE transmits the target uplink VOWIFI data on the target bearer.

In this embodiment, the CPE deeply parses the initial uplink VOWIFI data sent by the UE, to obtain the target uplink VOWIFI data, namely, the target uplink VOWIFI data corresponding to a data format that can be transmitted on the target bearer; and then the target uplink VOWIFI data is transmitted on the target bearer. Compared with a transmission mode of directly forwarding the VOWIFI data in the conventional technology, transmitting the VOWIFI data on the target bearer can ensure quality and security of a VoWifi service.

In a possible implementation of the first aspect of embodiments of this application, when the VOWIFI data of the UE is downlink VOWIFI data, the process in which the CPE transmits the VOWIFI data of the UE on the target bearer may include: The CPE receives, on the target bearer, initial downlink VOWIFI data sent by the network side device; the CPE parses the initial downlink VOWIFI data to obtain target downlink VOWIFI data; and the CPE sends the target downlink VOWIFI data to the UE.

In this embodiment, after the CPE receives, through the target bearer, the initial downlink VOWIFI data sent by the network side device, the CPE parses the initial downlink VOWIFI data to obtain the target downlink VOWIFI data; and then the CPE sends the target downlink VOWIFI data to the UE. Compared with a transmission mode of directly forwarding the VOWIFI data in the conventional technology, transmitting the VOWIFI data on the target bearer can ensure quality and security of a VoWifi service.

A second aspect of embodiments of this application provides a wireless communication method. The wireless communication method may be applied to VOWIFI communication, to be specific, UE may access, by using the method, a network side device to implement VOWIFI communication, where the UE is connected to the network side device through CPE. When the UE serves as calling UE in VOWIFI, the method performed by the UE specifically includes: The user equipment UE receives capability information of the customer premise equipment CPE sent by the CPE, and the UE determines, based on the capability information of the CPE, whether the CPE is used to process voice over wireless fidelity VOWIFI service communication; when the UE determines that the CPE is used to process the VOWIFI service communication, the UE sends a call request message to the CPE; and after the UE receives a call response message from the CPE, the UE sends VOWIFI data to the CPE. The UE can use the capability information of the CPE as a basis for determining whether the CPE is used to transmit the VOWIFI data. In other words, only when the UE determines that the capability information of the CPE meets a preset condition of the UE, that is, when the CPE can provide a high-quality voice data transmission service, the UE sends the call request message to the CPE to initiate voice calling. This ensures user experience when a user subsequently performs a voice service through the UE.

In a possible implementation of the second aspect of embodiments of this application, the capability information of the CPE includes a network support capability of the CPE. In this case, the process in which the UE determines, based on the capability information of the CPE, whether the CPE is used to process the VOWIFI service communication may specifically include: The UE determines whether the network support capability of the CPE includes an internet protocol multimedia subsystem (IMS) voice access capability; then, when the UE determines that the network support capability of the CPE includes the IMS voice access capability, the UE processes the VOWIFI service communication by using the CPE; and when the UE determines that the network support capability of the CPE does not include the IMS voice access capability, the UE processes the VOWIFI service communication without using the CPE.

In this embodiment, the UE may specifically use the network support capability of the CPE in the capability information of the CPE as a basis for determining whether the CPE is used to transmit the VOWIFI data. When the network support capability of the CPE includes the IMS voice access capability, that is, when the CPE supports IMS voice communication, it may be determined that the CPE supports VOWIFI communication. The UE may implement subsequent VOWIFI service communication by using the CPE.

In a possible implementation of the second aspect of embodiments of this application, the capability information of the CPE includes an air interface channel condition of the CPE. In this case, the process in which the UE determines, based on the capability information of the CPE, whether the CPE is used to process the VOWIFI service communication may specifically include: The UE determines whether the air interface channel condition of the CPE meets a threshold; then, when the UE determines that the air interface channel condition of the CPE meets the threshold, the UE processes the VOWIFI service communication by using the CPE; and when the UE determines that the air interface channel condition of the CPE does not meet the threshold, the UE processes the VOWIFI service communication without using the CPE.

In this embodiment, the air interface channel condition may include parameters such as a reference signal received power (RSRP) and a signal to interference plus noise ratio (SINR) of the CPE. A threshold of the air interface channel condition may be preset in the UE. Subsequently, only when the air interface channel condition of the CPE meets the threshold, the UE uses the CPE to process the VOWIFI service communication, to ensure quality of service of the VOWIFI service communication subsequently processed by the CPE, and improve user experience when a user performs a voice service.

In a possible implementation of the second aspect of embodiments of this application, the capability information of the CPE includes an air interface channel condition of the CPE. In this case, the process in which the UE determines, based on the capability information of the CPE, whether the CPE is used to process the VOWIFI service communication may specifically include: The UE determines whether the air interface channel condition of the CPE is superior to an air interface channel condition of a mobile data network; then, when the UE determines that the air interface channel condition of the CPE is superior to the air interface channel condition of the mobile data network, the UE processes the VOWIFI service communication by using the CPE; and when the UE determines that the air interface channel condition of the CPE is not superior to the air interface channel condition of the mobile data network, the UE processes the VOWIFI service communication without using the CPE.

In this embodiment, similarly, the air interface channel condition may include parameters such as a reference signal received power (RSRP) and a signal to interference plus noise ratio (SINR) of the CPE. When the UE has accessed the mobile data network, and the UE determines that the air interface channel condition of the CPE is superior to the air interface channel condition of the mobile data network, the UE processes the VOWIFI service communication by using the CPE, to ensure quality of service of the VOWIFI service communication subsequently processed by the CPE, and improve user experience when a user performs a voice service.

In a possible implementation of the second aspect of embodiments of this application, before the UE receives the capability information of the CPE sent by the CPE, the method may further include: The UE sends a registration message to the CPE; and the UE receives a registration response message sent by the CPE, where the registration response message includes the capability information of the CPE.

In this embodiment, the UE may receive, based on a plurality of messages, the capability information of the CPE sent by the CPE. To reduce signaling consumption, the capability information of the CPE may be carried in a registration response message in an initial registration process that is initiated by the UE to the CPE.

A third aspect of the embodiments of this application provides a wireless communication method. The wireless communication method may be applied to VOWIFI communication, to be specific, a network side device may access, by using the method, UE to implement VOWIFI communication, where the network side device is connected to the UE through CPE. When the UE serves as called UE in VOWIFI, the method performed by the network side device specifically includes: The network side device obtains a target paging message and a first identifier of the customer premise equipment CPE, where the target paging message includes a second identifier of the called user equipment UE associated with the CPE; then, the network side device sends the target paging message to the CPE corresponding to the first identifier; when the network side device receives a bearer setup request message sent by the CPE, the network side device sets up a target bearer, where the bearer setup request message indicates a request message to set up the target bearer, and the target bearer is used by the UE to perform voice over wireless fidelity VOWIFI service communication; after the target bearer is set up, the network side device sends a bearer setup response message to the CPE; and then, the network side device can transmit VOWIFI data of the called UE on the target bearer. The target bearer is used by the UE to perform the VOWIFI service communication, and is a dedicated target bearer that is set up by the network side device and that is used to transmit VOWIFI communication data. Then, the VOWIFI communication data of the UE may be transmitted through the dedicated target bearer. That is, the network side device may transmit the VOWIFI data of the UE on the dedicated target bearer. Compared with the conventional technology in which an ePDG network element needs to be added to implement VOWIFI transmission, a network element does not need to be added, and security and quality of service of voice service transmission are ensured through the target bearer. In addition, the network side device may also initiate, through the CPE, a voice call to the called UE associated with the CPE, to improve a plurality of voice call modes, thereby improving a success rate that the network side device initiates a voice call to the called UE.

It should be noted that the target bearer is used by the UE to perform the VOWIFI service communication, and is a dedicated target bearer that is set up by the network side device and that is used to transmit the VOWIFI communication data. In a long term evolution (LTE) network, the target bearer may be a dedicated target bearer that is used by an LTE network side device to transmit voice over long term evolution (VOLTE) data. In a 5G new radio (NR) network, the target bearer may be a dedicated target bearer that is used by an NR network side device to transmit voice over new radio (VONR) data. In a 6G network or a more advanced network in the future, the target bearer may be a corresponding dedicated target bearer used to transmit VOIP data. This is not limited herein.

In a possible implementation of the third aspect of embodiments of this application, the process in which the network side device obtains the target paging message and the first identifier of the customer premise equipment CPE may specifically include: The network side device obtains the first paging message, where the first paging message includes the target paging message and the first identifier.

In this embodiment, a process in which the network side device obtains the first identifier of the CPE may specifically be: obtaining the first identifier by directly parsing an initial first paging message. To be specific, the first paging message initially obtained by the network side device and used to indicate the called UE carries the first identifier of the CPE associated with the called UE, so that the network side device may initiate, to the CPE, a voice call of the called UE associated with the CPE. Therefore, a plurality of voice call modes are improved, to improve a success rate that the network side device initiates a voice call to the called UE.

In a possible implementation of the third aspect of embodiments of this application, the process in which the network side device obtains the target paging message and the first identifier of the customer premise equipment CPE may specifically include: The network side device obtains a second paging message, where the second paging message includes the second identifier; and the network side device determines the first identifier based on the second identifier.

In this embodiment, a process in which the network side device obtains the first identifier of the CPE may specifically be: indirectly obtaining the first identifier from the initial first paging message, where the second paging message initially obtained by the network side device includes the second identifier of the called UE. Then, the network side device may obtain, based on the second identifier of the called UE, the first identifier of the CPE associated with the called UE from a prestored database or another device. Then, the network side device initiates, through the CPE, a voice call of the called UE associated with the CPE.

In a possible implementation of the third aspect of embodiments of this application, before the network side device sends the target paging message to the CPE based on the first identifier, the method may further include: When the network side device fails to perform paging by using the second identifier, the network side device triggers execution of sending the target paging message to the CPE based on the first identifier.

In this embodiment, the network side device may directly initiate a call to the called UE through a mobile data network connection, or may initiate a call to the called UE through the CPE associated with the called UE. To reduce signaling consumption of the network side device, the network side device may first initiate a call to the called UE through a mobile data network. When failing to initiate a call, the network side device initiates a call to the called UE through the CPE associated with the called UE.

A fourth aspect of embodiments of this application provides a wireless communication method. The wireless communication method may be applied to VOWIFI communication, to be specific, CPE may enable, by using the method, UE to access a network side device to implement VOWIFI communication, where the UE is connected to the network side device through the CPE. When the UE serves as called UE in VOWIFI, the method performed by the CPE specifically includes:

The customer premise equipment CPE receives a target paging message sent by the network side device, where the target paging message includes a second identifier of UE associated with the CPE; if the UE is within a service scope of the CPE, the CPE sends a call request message to the UE; after the CPE receives a call response message sent by the UE, the CPE sends a bearer setup request message to the network side device, where the bearer setup request message indicates a request message to set up a target bearer, and the target bearer is used by the UE to perform voice over wireless fidelity VOWIFI service communication; and then, the CPE transmits VOWIFI data of the UE on the target bearer. The target bearer is used by the UE to perform the VOWIFI service communication, and is a dedicated target bearer that is set up by the network side device and that is used to transmit VOWIFI communication data. Then, the VOWIFI communication data of the UE may be transmitted through the dedicated target bearer, that is, the CPE may parse the VOWIFI data of the UE into data that can be transmitted on the dedicated target bearer. Compared with the conventional technology in which an ePDG network element needs to be added to implement VOWIFI transmission, a network element does not need to be added, and security and quality of service of voice service transmission are ensured through the target bearer.

It should be noted that the target bearer is used by the UE to perform VOWIFI service communication, and is a dedicated target bearer that is set up by the network side device and that is used to transmit the VOWIFI communication data. In a long term evolution (LTE) network, the target bearer may be a dedicated target bearer that is used by an LTE network side device to transmit voice over long term evolution (VOLTE) data. In a 5G new radio (NR) network, the target bearer may be a dedicated target bearer that is used by an NR network side device to transmit voice over new radio (VONR) data. In a 6G network or a more advanced network in the future, the target bearer may be a corresponding dedicated target bearer used to transmit VOIP data. This is not limited herein.

In a possible implementation of the fourth aspect of embodiments of this application, when the VOWIFI data of the UE is uplink VOWIFI data, the process in which the CPE transmits the VOWIFI data of the UE on the target bearer may include: The CPE receives initial uplink VOWIFI data sent by the UE; the CPE parses the initial uplink VOWIFI data to obtain target uplink VOWIFI data; and the CPE transmits the target uplink VOWIFI data on the target bearer.

In this embodiment, the CPE deeply parses the initial uplink VOWIFI data sent by the UE, to obtain the target uplink VOWIFI data, namely, the target uplink VOWIFI data corresponding to a data format that can be transmitted on the target bearer; and then the target uplink VOWIFI data is transmitted on the target bearer. Compared with a transmission mode of directly forwarding the VOWIFI data in the conventional technology, transmitting the VOWIFI data on the target bearer can ensure quality and security of a VoWifi service.

In a possible implementation of the fourth aspect of embodiments of this application, when the VOWIFI data of the UE is downlink VOWIFI data, the process in which the CPE transmits the VOWIFI data of the UE on the target bearer may include: The CPE receives, on the target bearer, initial downlink VOWIFI data sent by the network side device; the CPE parses the initial downlink VOWIFI data to obtain target downlink VOWIFI data; and the CPE sends the target downlink VOWIFI data to the UE.

In this embodiment, after the CPE receives, through the target bearer, the initial downlink VOWIFI data sent by the network side device, the CPE parses the initial downlink VOWIFI data to obtain the target downlink VOWIFI data; and then the CPE sends the target downlink VOWIFI data to the UE. Compared with a transmission mode of directly forwarding the VOWIFI data in the conventional technology, transmitting the VOWIFI data on the target bearer can ensure quality and security of a VoWifi service.

A fifth aspect of embodiments of this application provides customer premise equipment CPE. The CPE has a function of implementing the method according to the first aspect or any one of the possible implementations of the first aspect, or the CPE has a function of implementing the method according to the fourth aspect or any one of the possible implementations of the fourth aspect. The function may be implemented by hardware, or may be implemented by hardware executing corresponding software. The hardware or software includes one or more modules corresponding to the foregoing function, for example, a receiving unit, a sending unit, and a transmission unit.

A sixth aspect of embodiments of this application provides user equipment UE. The UE has a function of implementing the method according to the second aspect or any one of the possible implementations of the second aspect. The function may be implemented by hardware, or may be implemented by hardware executing corresponding software. The hardware or software includes one or more modules corresponding to the foregoing function, for example, a receiving unit, a determining unit, and a sending unit.

A seventh aspect of embodiments of this application provides a network side device. The network side device has a function of implementing the method according to the third aspect or any one of the possible implementations of the third aspect. The function may be implemented by hardware, or may be implemented by hardware executing corresponding software. The hardware or software includes one or more modules corresponding to the foregoing function, for example, an obtaining unit, a sending unit, a receiving unit, a transmission unit, and a triggering unit.

An eighth aspect of embodiments of this application provides customer premise equipment CPE, including a processor. The processor is coupled to a memory, the memory is configured to store a computer program or instructions, and the processor is configured to execute the computer program or the instructions in the memory, so that the method according to the first aspect and any one of the embodiments of the first aspect is performed, or the method according to the fourth aspect and any one of the embodiments of the fourth aspect is performed.

A ninth aspect of embodiments of this application provides user equipment UE, including a processor. The processor is coupled to a memory, the memory is configured to store a computer program or instructions, and the processor is configured to execute the computer program or the instructions in the memory, so that the method according to the second aspect and any one of the embodiments of the second aspect is performed.

A tenth aspect of embodiments of this application provides a network side device, including a processor. The processor is coupled to a memory, the memory is configured to store a computer program or instructions, and the processor is configured to execute the computer program or the instructions in the memory, so that the method according to the third aspect and any one of the embodiments of the third aspect is performed.

An eleventh aspect of embodiments of this application provides a communication system. The communication system includes the customer premise equipment CPE according to the eighth aspect, the user equipment UE according to the ninth aspect, and the network side device according to the tenth aspect.

A twelfth aspect of embodiments of this application provides a computer-readable storage medium. The computer-readable storage medium stores a function used to implement the method according to the first aspect or any one of the possible implementations of the first aspect, stores a program or instructions used to implement the method according to the second aspect or any one of the possible implementations of the second aspect, stores a program or instructions used to implement the method according to the third aspect or any one of the possible implementations of the third aspect, or stores a function used to implement the method according to the fourth aspect or any one of the possible implementations of the fourth aspect.

A thirteenth aspect of embodiments of this application provides a computer program product. The program product includes a program. When the program is run, the method according to the first aspect or any one of the possible implementations of the first aspect, the method according to the second aspect or any one of the possible implementations of the second aspect, the method according to the third aspect or any one of the possible implementations of the third aspect, or the method according to the fourth aspect or any one of the possible implementations of the fourth aspect is performed.

A fourteenth aspect of embodiments of this application provides a chip system. The chip system includes a processor, and is configured to support customer premise equipment CPE to implement a function in the first aspect or any one of the possible implementations of the first aspect, or is configured to support customer premise equipment CPE to implement a function in the fourth aspect or any one of the possible implementations of the fourth aspect. In a possible design, the chip system may further include a memory, and the memory is configured to store program instructions and data that are necessary for a core network element. The chip system may include a chip, or may include the chip and another discrete component.

A fifteenth aspect of embodiments of this application provides a chip system. The chip system includes a processor, and is configured to support user equipment UE to implement a function in the second aspect or any one of the possible implementations of the second aspect. In a possible design, the chip system may further include a memory, and the memory is configured to store program instructions and data that are necessary for a core network element. The chip system may include a chip, or may include the chip and another discrete component.

A sixteenth aspect of embodiments of this application provides a chip system. The chip system includes a processor, and is configured to support a network side device to implement a function in the third aspect or any one of the possible implementations of the third aspect. In a possible design, the chip system may further include a memory, and the memory is configured to store program instructions and data that are necessary for a core network element. The chip system may include a chip, or may include the chip and another discrete component.

For technical effects brought by any one of the fifth aspect, the eighth aspect, the eleventh aspect, the twelfth aspect, the thirteenth aspect, and the fourteenth aspect, or the possible implementations thereof, refer to technical effects brought by the first aspect or different possible implementations of the first aspect, or refer to technical effects brought by the fourth aspect or different possible implementations of the fourth aspect. Details are not described herein again.

For technical effects brought by the sixth aspect, the ninth aspect, the eleventh aspect, the twelfth aspect, the thirteenth aspect, and the fifteenth aspect, or any one of the possible implementations thereof, refer to technical effects brought by the second aspect or different possible implementations of the second aspect. Details are not described herein again.

For technical effects brought by the seventh aspect, the tenth aspect, the eleventh aspect, the twelfth aspect, the thirteenth aspect, and the sixteenth aspect, or any one of the possible implementations thereof, refer to technical effects brought by the third aspect or different possible implementations of the third aspect. Details are not described herein again.

It can be learned from the foregoing technical solutions that embodiments of this application have the following advantages:

In the embodiments, the customer premise equipment CPE receives the call request message from the UE, and the CPE sends the bearer setup request message to the network side device based on the call request message, where the bearer setup request message indicates a request to set up the target bearer, and the target bearer is used by the UE to perform the VOWIFI service communication; and after the CPE receives the bearer setup response message sent by the network side device, the CPE sends the call response message to the UE, so that the CPE transmits the VOWIFI data of the UE on the target bearer. The target bearer is used by the UE to perform VOWIFI service communication, and is a dedicated target bearer that is set up by the network side device and that is used to transmit VOWIFI communication data. Then, the VOWIFI communication data of the UE may be transmitted through the dedicated target bearer, that is, the CPE may parse the VOWIFI data of the UE into data that can be transmitted on the dedicated target bearer. Compared with the conventional technology in which an ePDG network element needs to be added to implement VOWIFI transmission, a network element does not need to be added, and security and quality of service of voice service transmission are ensured through the target bearer.

DESCRIPTION OF EMBODIMENTS

In the conventional technology, a VOWIFI service may be implemented through CPE. The CPE is a mobile signal access device that receives a mobile signal from a network side and forwards the mobile signal as a wireless Wi-Fi signal, and the CPE can convert a high-speed 4G signal or 5G signal on the network side into a Wi-Fi signal for communication with a terminal, that is, a connection between the terminal and the network side is implemented by using the Wi-Fi signal. The CPE may be widely applied to wireless network access in rural areas, towns, hospitals, institutions, factories, residential areas, and the like, and can save costs of laying a wired network. However, in this solution, an ePDG network element needs to be deployed on the network side, and the terminal and the network side that are connected to the CPE need to be enhanced, to support implementation of this solution. This process is too complicated and is not beneficial to popularization and application of a VOWIFI technology. Therefore, embodiments of this application provide a wireless communication method, customer premise equipment CPE, user equipment UE, and a network side device, to implement transmission of VOWIFI data. Compared with the conventional technology in which an ePDG network element needs to be added to implement VOWIFI data transmission, a network element does not need to be added, and security and quality of service of voice service transmission are ensured through a dedicated target bearer.

Figure 1:
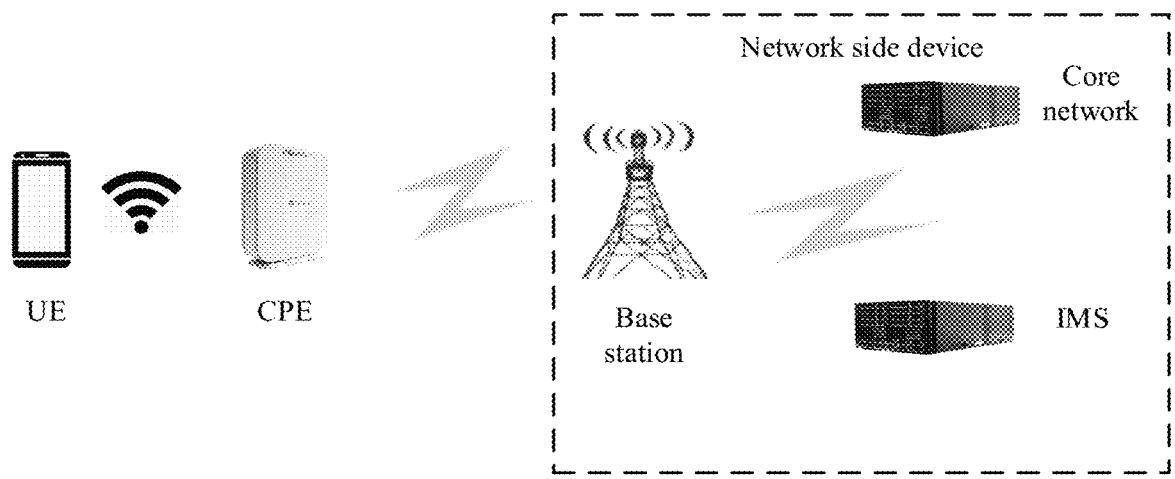
FIG. 1 is a schematic diagram of a network system framework according to an embodiment of this application.

Refer to FIG. 1. In this embodiment of this application, based on a network architecture shown in FIG. 1, a network has been deployed and a VoIP function is enabled, where CPE may be considered as a mobile signal access device that receives a mobile signal and forwards the mobile signal to UE as a wireless Wi-Fi signal, the UE that supports the VoIP function and supports a VoWifi function accesses a Wi-Fi network of the CPE, and then the CPE wirelessly accesses a base station, and is further connected to a core network and an IMS network element. The UE and the CPE may be served by a same operator. If the UE and the CPE are not served by the same operator, the two operators may sign a roaming agreement. It should be noted that, when a network accessed by the CPE is an LTE network, the base station shown in this figure may be an evolved NodeB (eNB), and a core network may be an evolved packet core (EPC); and when the network accessed by the CPE is a 5G NR network, the base station shown in this figure may be a next generation NodeB (gNB), and the core network may be a next generation core (NGC). In addition, the CPE may also access a 6G network or a more advanced network. This is not limited herein. In addition, the UE may be a smartphone, a tablet, a vehicle terminal, or another user equipment. This is not limited herein.

The following specifically describes embodiments of this application with reference to the drawings. In a VOWIFI data transmission process, the UE may serve as calling UE, or may serve as called UE. The following separately describes the two application scenarios with reference to specific embodiments.

I. The UE Serves as Calling UE.

Currently, the calling UE performs a voice service through a VOWIFI network in the following different manners:

1. A user directly accesses an IMS network through local distribution of a wireless local area network (WLAN), to perform a voice service. In this solution, a terminal directly accesses the IMS network, to provide a voice service for a Wi-Fi network to access the terminal. As long as the terminal supports Wi-Fi access, only the IMS network needs to be reconstructed. However, handover continuity cannot be ensured, there is a restriction or obstacle to interconnection with an operator user, a regulatory service cannot be performed, and voice continuity cannot be ensured.

2. The user accesses the Wi-Fi network with an unlicensed mobile access (UMA) (for example, a 2.4 GHz/5.8 GHz Wi-Fi frequency band), to perform a voice service. A UMA-based VOWIFI solution is a VOWIFI voice solution in which a device (similar to a radio network controller (RNC)) is deployed in the Wi-Fi network, and accesses a circuit switched (CS) core network through an Iu-CS interface. A core network device of the CS network is reused. The VOWIFI voice solution can be implemented by deploying a corresponding device. This solution has been implemented on some smartphones. However, accessing CS does not comply with a network evolution direction, implementation on the terminal is complex, and a new device similar to RNC needs to be provided.

3. The user accesses a packet switched (PS) domain network in the Wi-Fi network to perform a VOWIFI service. This solution includes two WLAN access architectures. One is a VOWIFI voice (hereinafter referred to as an S2b-based VOWIFI) under a WLAN untrusted access architecture; and the other is a VOWIFI voice (namely, an S2a-based VOWIFI) under a WLAN trusted access architecture. However, an ePDG network element needs to be deployed, and the terminal, the IMS network, and EPC network need to be enhanced to support this solution.

4. The Wi-Fi network provides a voice implementation in which various over the top (OTT) voices are provided for a user through the Internet. However, an OTT-based voice solution is not a carrier-grade voice solution, has low reliability, does not support a supplementary service and a QoS guarantee, and cannot maintain services and experiences consistent with a VoLTE/CS voice. In addition, the OTT-based voice solution is difficult to provide a general service, for example, an emergency call, and a regulatory service. Due to lack of standards, solutions such as roaming and interconnection are difficult to implement.

Figure 2:
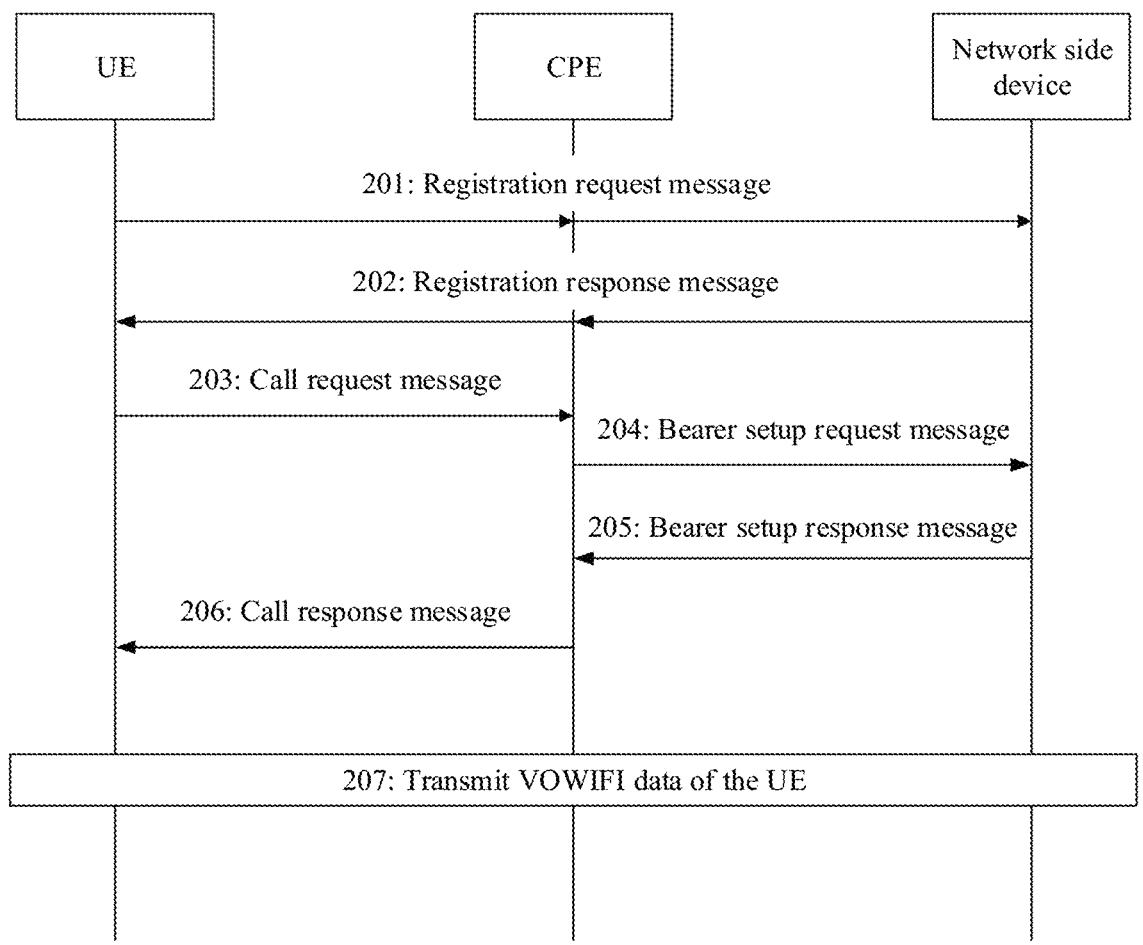
FIG. 2 is a schematic diagram of an embodiment of a wireless communication method according to an embodiment of this application.

The foregoing describes disadvantages of existing VOWIFI voice solutions, and major disadvantages include: security, mobility, and network element deployment or software upgrade on a network side. To resolve the foregoing problems, an embodiment of this application provides a wireless communication method. The wireless communication method may be applied to VOWIFI communication, to be specific, when UE performs calling, CPE may enable, by using the method, the UE to access a network side device, to implement VOWIFI communication, where the UE is connected to the network side device through the CPE. With reference to FIG. 2, an embodiment of the wireless communication method in embodiments of this application includes the following steps.

201: The UE sends a registration request message to the CPE.

In this embodiment, before the UE initiates a calling voice service through the CPE, the UE first needs to initiate a registration procedure to the CPE, that is, the UE first sends the registration request message to the CPE. For example, in a session initiation protocol (SIP), the registration request message may be specifically a message carrying a REGISTER (registration) information element.

After the CPE receives the registration request message sent by the UE in step 201, the CPE transparently transmits the registration request message to the network side device, so that the network side device performs, based on the registration request message, the registration procedure of the UE on the network side. After the network side device completes the registration procedure of the UE, the network side device generates a registration response message and feeds back the registration response message to the CPE, to trigger execution of step 202.

202: The CPE sends the registration response message to the UE.

In this embodiment, after the CPE receives the registration request message sent by the UE in step 201, the CPE sends the registration response message to the UE. For example, in the SIP, the registration response message may be specifically a message carrying a 200_OK information element.

Before the CPE sends the registration response message to the UE, the CPE may selectively determine access validity of the UE. For example, when the CPE and the UE are served by a same operator, the CPE may determine whether the registration request message sent by the UE carries a pre-agreed identification code. When the registration request message sent by the UE carries the pre-agreed identification code, the CPE triggers execution of sending the registration response message to the UE. Alternatively, when the CPE and the UE are served by the same operator, the CPE determines whether the UE has signed a roaming agreement. When the UE has signed the roaming agreement, the CPE triggers execution of sending the registration response message to the UE. There may alternatively be another determining method. This is not limited herein.

Specifically, after the CPE receives the registration response message sent by the network side device, the CPE may send the registration response message to the UE. In this process, the "CPE+network side device" appears as a black box for the UE, that is, the UE is unaware of the process. In addition, the CPE may modify the registration response message, to enable the registration response message to carry capability information of the CPE. The capability information of the CPE may include a network support capability of the CPE and/or an air interface channel condition of the CPE, where the air interface channel condition may include an RSRP, an SINR, and the like of the CPE, or may include another parameter.

203: The UE sends a call request message to the CPE.

In this embodiment, the UE serves as calling UE, and initiates a calling procedure through the CPE, that is, the UE sends the call request message to the CPE. For example, in the SIP, the call request message may specifically be a message carrying an INVITE (a request).

Before the UE sends the call request message to the CPE, the UE can obtain the capability information of the CPE based on the registration response message in step 202. It may be understood that the UE can obtain the capability information of the CPE based on the registration response message in step 202, and the UE can also obtain the capability information of the CPE based on another message exchanged between the CPE and the UE, for example, SIP_100_TRYING (response trying), SIP_183_Session_Progress (session process), SIP_UPDATE (status update), SIP_RINGING (ringing), Service_Request_ACCEPT (service request accept), and Connect_Acknowledge (connection acknowledgment), which is not limited herein. After the UE obtains the capability information of the CPE, the UE can use the capability information of the CPE as a basis for determining whether the CPE is used to transmit VOWIFI data. In other words, only when the UE determines that the capability information of the CPE meets a preset condition of the UE, that is, when the CPE can provide a high-quality voice data transmission service, the UE performs step 203. To be specific, the UE sends the call request message to the CPE to initiate voice calling, to ensure user experience when a user subsequently uses the UE to perform a voice service. The following describes a determining process of the UE through a specific embodiment.

(1) The capability information of the CPE includes the network support capability of the CPE. In this case, the process in which the UE determines, based on the capability information of the CPE, whether the CPE is used to process VOWIFI service communication may specifically include: The UE determines whether the network support capability of the CPE includes an IMS voice access capability; then, when the UE determines that the network support capability of the CPE includes the IMS voice access capability, the UE processes the VOWIFI service communication by using the CPE; and when the UE determines that the network support capability of the CPE does not include the IMS voice access capability, the UE processes the VOWIFI service communication without using the CPE.

In this embodiment, the UE may specifically use the network support capability of the CPE in the capability information of the CPE as a basis for determining whether the CPE is used to transmit the VOWIFI data. When the network support capability of the CPE includes the IMS voice access capability, that is, when the CPE supports IMS voice communication, it may be determined that the CPE supports VOWIFI communication. The UE may implement subsequent VOWIFI service communication by using the CPE.

(2) The capability information of the CPE includes the air interface channel condition of the CPE. In this case, the process in which the UE determines, based on the capability information of the CPE, whether the CPE is used to process the VOWIFI service communication may specifically include: The UE determines whether the air interface channel condition of the CPE meets a threshold; then, when the UE determines that the air interface channel condition of the CPE meets the threshold, the UE processes the VOWIFI service communication by using the CPE; and when the UE determines that the air interface channel condition of the CPE does not meet the threshold, the UE processes the VOWIFI service communication without using the CPE.

In this embodiment, the air interface channel condition may include the RSRP, the SINR, and the like of the CPE, or another parameter of the CPE. A threshold of the air interface channel condition may be preset in the UE. Subsequently, only when the air interface channel condition of the CPE meets the threshold, the UE uses the CPE to process the VOWIFI service communication, to ensure quality of service of the VOWIFI service communication subsequently processed by using the CPE, and improve user experience when a user performs a voice service.

(3) The capability information of the CPE includes the air interface channel condition of the CPE. In this case, the process in which the UE determines, based on the capability information of the CPE, whether the CPE is used to process the VOWIFI service communication may specifically include: The UE determines whether the air interface channel condition of the CPE is superior to an air interface channel condition of a mobile data network; then, when the UE determines that the air interface channel condition of the CPE is superior to the air interface channel condition of the mobile data network, the UE processes the VOWIFI service communication by using the CPE; and when the UE determines that the air interface channel condition of the CPE is not superior to the air interface channel condition of the mobile data network, the UE processes the VOWIFI service communication without using the CPE.

In this embodiment, similarly, the air interface channel condition may include the RSRP, the SINR, and the like, or another parameter of the CPE. When the UE has accessed the mobile data network, and the UE determines that the air interface channel condition of the CPE is superior to the air interface channel condition of the mobile data network, the UE processes the VOWIFI service communication by using the CPE, to ensure quality of service of the VOWIFI service communication subsequently processed by using the CPE, and improve user experience when a user performs a voice service.

204: The CPE sends a bearer setup request message to the network side device.

In this embodiment, after the CPE receives the call request message sent by the UE, the CPE sends the bearer setup request message to the network side device, to set up a dedicated target bearer to perform the VOWIFI service of the UE. For example, when a network accessed by the CPE is an LTE network, the bearer setup request message may include an activate default EPS bearer context request (default EPS bearer context activation request). It may be understood that when the CPE accesses a different network, for example, a 5G NR network or a more advanced 6G network, a specific information element of the message may be another bearer setup request message specified in the protocol, which is not limited herein.

After the CPE receives the call request message sent by the UE in step 203, a process in which the CPE may establish a radio resource control (RRC) connection to the network side device specifically includes: The CPE sends an RRC connection request message to the network side device, the network side device sends an RRC connection setup message to the CPE, and the CPE sends an RRC connection setup complete message to the network side device, to complete a process of establishing an RRC connection. Then, the CPE performs step 204 to send the bearer setup request message to the network side device.

205: The network side device sends a bearer setup response message to the CPE.

In this embodiment, when the network side device determines that the bearer setup request message sent by the CPE is valid, the network side device may set up the target bearer, and send a bearer setup response message to the CPE after the target bearer is set up. For example, when a network accessed by the CPE is an LTE network, the bearer setup request message may include SIP_183_Session_Progress (SDP Session) SIP description process session. Similarly, when the CPE accesses a different network, for example, a 5G NR network or a more advanced 6G network, a specific information element of the message may be another bearer setup response message specified in the protocol, which is not limited herein.

The target bearer is used by the UE to perform VOWIFI service communication, and is a dedicated target bearer that is set up by the network side device and that is used to transmit VOWIFI communication data. In the LTE network, the target bearer may be a dedicated target bearer that is used by an LTE network side device to transmit VOLTE data. In the 5G NR network, the target bearer may be a dedicated target bearer that is used by an NR network side device to transmit VONR data. In the 6G network or a more advanced network in the future, the target bearer may be a corresponding dedicated target bearer used to transmit VOIP data. This is not limited herein.

206: The CPE sends a call response message to the UE.

In this embodiment, after the CPE receives the bearer setup response message sent by the network side device, the CPE determines that a service corresponding to VOWIFI calling can be provided for the UE, so that the CPE sends the call response message to the UE. For example, in the SIP, the call response message may be a message carrying a SIP_183/180/200 information element.

207: The UE, the CPE, and the network side device transmit the VOWIFI data of the UE.

In this embodiment, the CPE transmits the VOWIFI data of the UE on the dedicated target bearer. In the data transmission process, for the CPE, the VOWIFI data of the UE may clearly include uplink VOWIFI data and downlink VOWIFI data. The process is described in detail below:

(1) When the VOWIFI data of the UE is uplink VOWIFI data, the process in which the CPE transmits the VOWIFI data of the UE on the target bearer may include: The CPE receives initial uplink VOWIFI data sent by the UE; the CPE parses the initial uplink VOWIFI data to obtain target uplink VOWIFI data; and the CPE transmits the target uplink VOWIFI data on the target bearer.

In this embodiment, the CPE deeply parses the initial uplink VOWIFI data sent by the UE, to obtain the target uplink VOWIFI data, namely, the target uplink VOWIFI data corresponding to a data format that can be transmitted on the target bearer; and then the target uplink VOWIFI data is transmitted on the target bearer. Compared with a transmission mode of directly forwarding the VOWIFI data in the conventional technology, transmitting the VOWIFI data on the target bearer can ensure quality and security of a VoWifi service.

(2) When the VOWIFI data of the UE is downlink VOWIFI data, the process in which the CPE transmits the VOWIFI data of the UE on the target bearer may include: The CPE receives, on the target bearer, initial downlink VOWIFI data sent by the network side device; the CPE parses the initial downlink VOWIFI data to obtain target downlink VOWIFI data; and the CPE sends the target downlink VOWIFI data to the UE.

In this embodiment, after the CPE receives, through the target bearer, the initial downlink VOWIFI data sent by the network side device, the CPE parses the initial downlink VOWIFI data to obtain the target downlink VOWIFI data; and then the CPE sends the target downlink VOWIFI data to the UE. Compared with a transmission mode of directly forwarding the VOWIFI data in the conventional technology, transmitting the VOWIFI data on the target bearer can ensure quality and security of a VoWifi service.

II. When the UE Serves as Called UE.

In a scenario in which the UE serves as called UE, a UE to network relay technology is defined in TS 36.764 in 3GPP Re15: Remote UE that is not within a cell coverage area may access a network through relay UE. The remote UE should be connected to the relay UE, to receive paging through the relay UE. When the remote UE is within or outside a coverage area of an E-UTRAN, the remote UE supports receiving network paging from the relay UE, and the relay UE also supports a network to forward paging of the remote UE.

Figure 3:
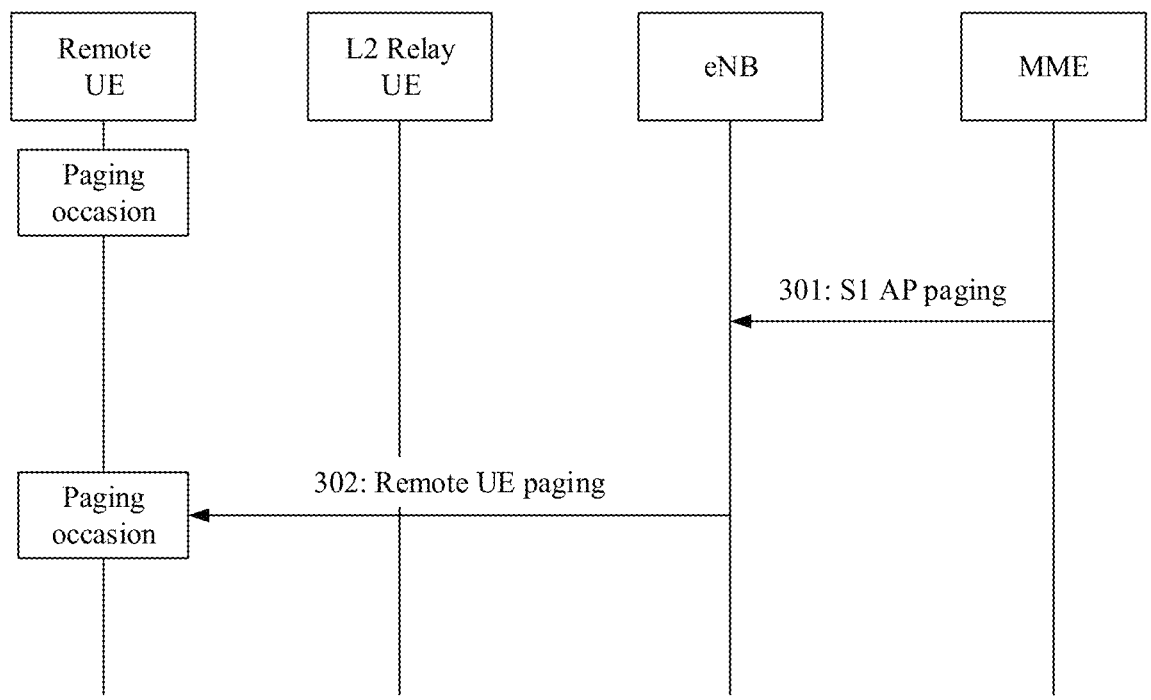
FIG. 3 a schematic diagram of an embodiment of UE paging according to an embodiment of this application.
Figure 4:
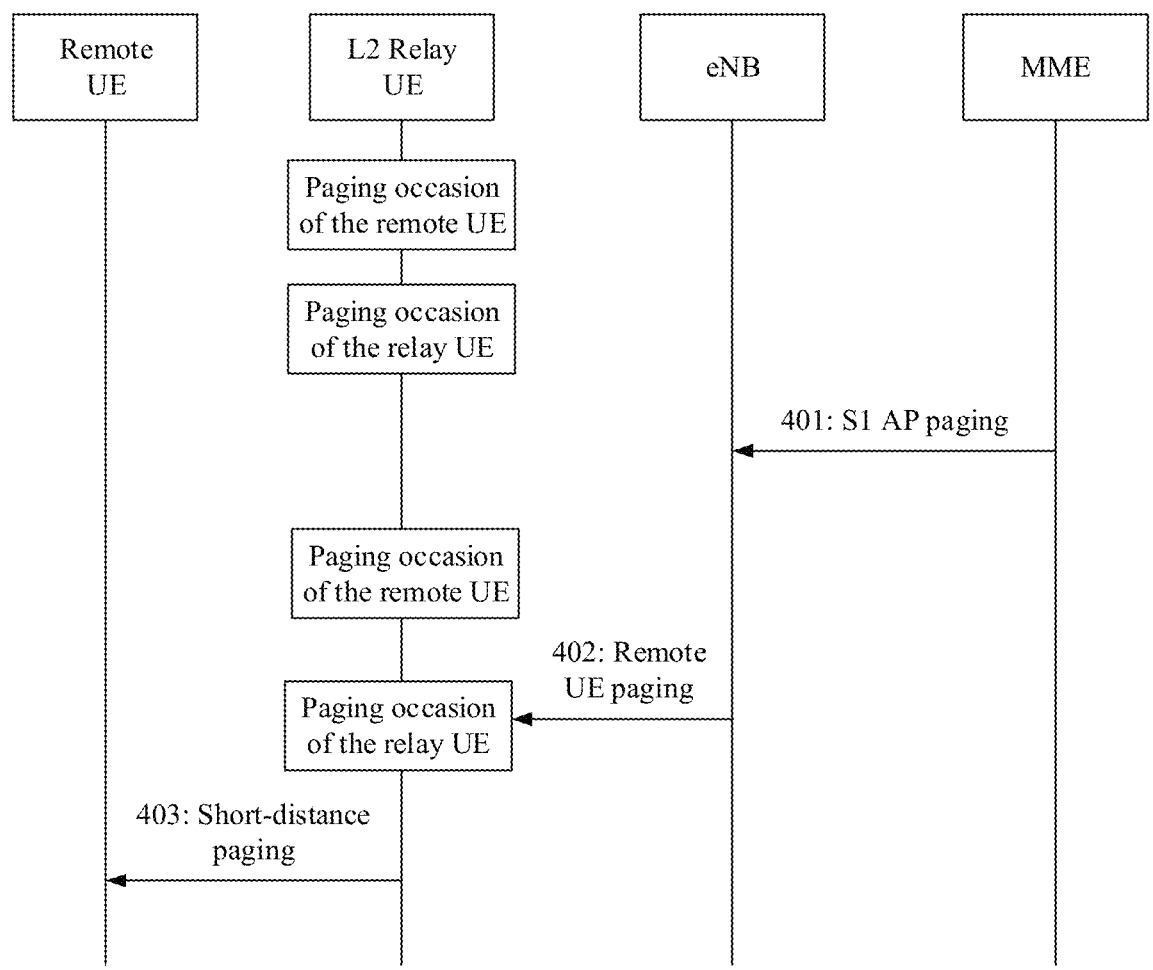
FIG. 4 is another schematic diagram of an embodiment of UE paging according to an embodiment of this application.
Figure 5:
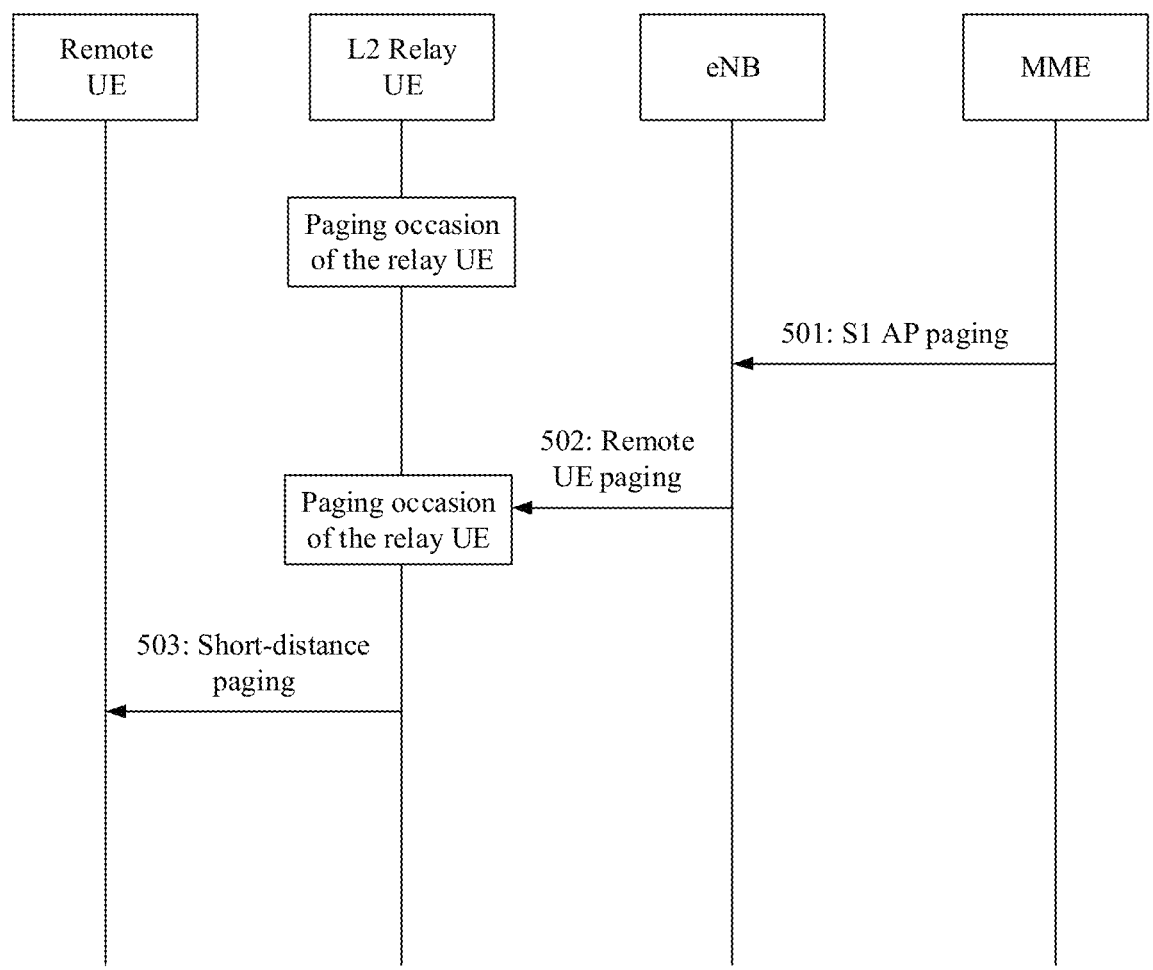
FIG. 5 is another schematic diagram of an embodiment of UE paging according to an embodiment of this application.

When the remote UE is within the coverage area, an eNB may configure whether the remote UE listens on a Uu interface to receive a paging message or listens on a sidelink (a direct communication link between UEs) to receive a paging message. As shown in FIG. 3 to FIG. 5, that the UE accesses an LTE network is used as example for description. In this case, the network side device initiates paging through an MME. The network side device has a plurality of possible paging options. In a network coverage area, the network side device "communicates" with the remote UE in an RRC_IDLE state on a downlink.

1. As shown in FIG. 3, the remote UE listens on the Uu interface for a paging opportunity (PO) of the remote UE. Therefore, the relay UE does not need to transmit paging of the remote UE of proximity-based services (ProSe) on a short-range link.

This paging mode is not applicable when the remote UE is not within the coverage area of the E-UTRAN.

2. As shown in FIG. 4, in addition to a POI of the relay UE, the relay UE further monitors the PO of the remote UE connected to the relay UE. In this case, the remote UE does not need to attempt to receive paging on the downlink. The relay UE may need to listen to a plurality of paging moments. The relay UE needs to know the paging opportunity of the remote UE, decode the paging message, and determine which remote UE is the paging for. The relay UE may need to forward the paging of the remote UE on the short-range link.

For this paging mode, the relay UE needs to listen to a plurality of POs. This reduces power efficiency of the relay UE, because power consumption may increase as a quantity of remote UEs connected to the relay UE increases. In addition, the relay UE needs to transmit paging of an evolved ProSe remote UE on the short-range link, which brings extra power consumption and extra resource usage to the relay UE.

3. As shown in FIG. 5, the relay UE only listens to the PO of the relay UE, and the paging of the remote UE is also sent in the PO of the relay UE. The remote UE does not need to attempt to receive paging on the downlink. The relay UE needs to decode the paging message to determine which remote UE is the paging for, and needs to forward paging information of the remote UE on the short-range link. In this case, a core network (for example, an MME) needs to learn about a link status between the relay UE and the remote UE, and remap the paging message of the remote UE to the PO of the relay UE for sending.

For this paging mode, the relay UE needs to transmit paging of the remote UE on the short-range link. In this case, extra power consumption is caused to the relay UE and a secondary carrier resource is additionally used. In addition, the network needs to learn about the link status between the relay UE and the evolved ProSe remote UE.

Figure 6:
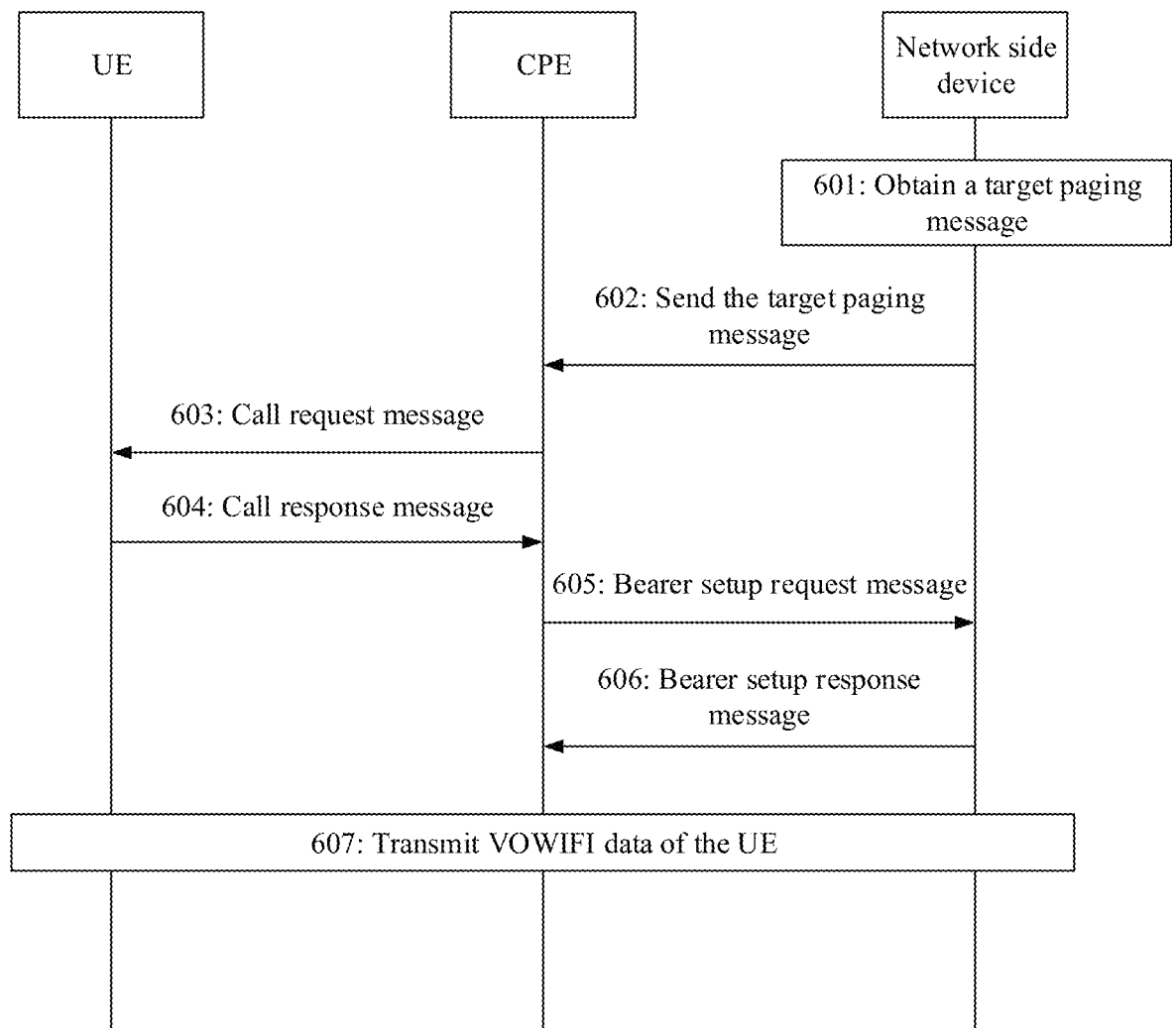
FIG. 6 is another schematic diagram of an embodiment of a wireless communication method according to an embodiment of this application.

In addition, the three alternatives in FIG. 3 to FIG. 5 each have the following disadvantages: Only link-level quality of service (QoS) can be ensured, and a higher-level service QoS cannot be ensured based on a service characteristic (for example, a voice service). To resolve the foregoing problems, an embodiment of this application provides a wireless communication method. The wireless communication method may be applied to VOWIFI communication, to be specific, a network side device may access, by using the method, UE to implement VOWIFI communication, where the network side device is connected to the UE through CPE. Refer to FIG. 6. Another embodiment of the wireless communication method in embodiments of this application includes:

601: The network side device obtains a target paging message.

In this embodiment, the network side device obtains the target paging message and a first identifier of the CPE, where the target paging message includes a second identifier of called UE associated with the CPE.

Specifically, the network side device obtains the target paging message and the first identifier of the CPE in a plurality of manners. The following separately describes the manners.

(1) The network side device obtains a first paging message, where the first paging message includes the target paging message and the first identifier.

In this embodiment, a process in which the network side device obtains the first identifier of the CPE may specifically be: obtaining the first identifier by directly parsing an initial first paging message. To be specific, the first paging message initially obtained by the network side device and used to indicate the called UE carries the first identifier of the CPE associated with the called UE, so that the network side device may initiate, to the CPE, a voice call of the called UE associated with the CPE. Therefore, a plurality of voice call modes are implemented, to improve a success rate that the network side device initiates a voice call to the called UE.

(2) The network side device obtains a second paging message, where the second paging message includes the second identifier; and the network side device determines the first identifier based on the second identifier.

In this embodiment, a process in which the network side device obtains the first identifier of the CPE may specifically be: indirectly obtaining the first identifier from the initial first paging message, where the second paging message initially obtained by the network side device includes the second identifier of the called UE. Then, the network side device may obtain, based on the second identifier of the called UE, the first identifier of the CPE associated with the called UE from a prestored database or another device. Then, the network side device initiates, through the CPE, a voice call of the called UE associated with the CPE.

602: The network side device sends the target paging message to the CPE.

In this embodiment, after the network side device obtains the target paging message and the first identifier in step 601, the network side device may determine, based on the first identifier, the CPE corresponding to the first identifier, and then send the target paging message to the CPE, to page the UE associated with the CPE.

Before the network side device sends the target paging message to the CPE based on the first identifier, the method may further include: When the network side device fails to perform paging by using the second identifier, the network side device triggers execution of sending the target paging message to the CPE based on the first identifier. Specifically, the network side device may directly initiate a call to the called UE through a mobile data network connection, or may initiate a call to the called UE through the CPE associated with the called UE. To reduce signaling consumption of the network side device, the network side device may first initiate a call to the called UE through a mobile data network. When failing to initiate a call, the network side device performs step 602, to be specific, the network side device initiates a call to the called UE through the CPE associated with the called UE.

603: The CPE sends a call request message to the UE.

In this embodiment, after receiving the target paging message sent by the network side device, the CPE may send the call request message to the corresponding UE based on the second identifier of the UE in the target paging message. For example, in an SIP, the call request message may be INVITE signaling sent by the CPE to a mobile phone, and is used to notify the UE of a paging message.

Clearly, before step 603 is performed, that is, before the CPE sends the call request message to the UE, the UE may initiate an initial registration procedure, to be specific, the UE and the CPE may perform step 201 to step 202. Details are not described herein again.

604: The UE sends a call response message to the CPE.

In this embodiment, after the UE receives the call request message sent by the CPE, when the UE determines that a call process corresponding to the call request message needs to be connected, the UE sends the call response message to the CPE. For example, in the SIP, the response message sent by the UE to the CPE may include SIP_183/180/200.

605: The CPE sends a bearer setup request message to the network side device.

In this embodiment, after receiving the call response message sent by the UE, the CPE may send the bearer setup request message to the network side device, to set up a dedicated target bearer to perform a VOWIFI service of the UE.

After the CPE receives the call response message sent by the UE in step 604, a process in which the CPE may establish a radio resource control (RRC) connection to the network side device specifically includes: The CPE sends an RRC connection request message to the network side device, the network side device sends an RRC connection setup message to the CPE, and the CPE sends an RRC connection setup complete message to the network side device, to complete a process of establishing an RRC connection. Then, the CPE performs step 605 to send the bearer setup request message to the network side device. For example, when a network accessed by the CPE is an LTE network, the bearer setup request message may include an activate default EPS bearer context request (default EPS bearer context activation request). It may be understood that when the CPE accesses a different network, for example, a 5G NR network or a more advanced 6G network, a specific information element of the message may be another bearer setup request message specified in the protocol, which is not limited herein.

606: The network side device sends a bearer setup response message to the CPE.

In this embodiment, when the network side device determines that the bearer setup request message sent by the CPE is valid, the network side device may set up the target bearer, and send a bearer setup response message to the CPE after the target bearer is set up. For example, when a network accessed by the CPE is an LTE network, the bearer setup request message may include SIP_183_Session_Progress (SDP Session) SIP description process session. Similarly, when the CPE accesses a different network, for example, the 5G NR network or the more advanced 6G network, a specific information element of the message may be another bearer setup response message specified in the protocol, which is not limited herein.

The target bearer is used by the UE to perform VOWIFI service communication, and is a dedicated target bearer that is set up by the network side device and that is used to transmit VOWIFI communication data. In the LTE network, the target bearer may be a dedicated target bearer that is used by an LTE network side device to transmit VOLTE data. In the 5G NR network, the target bearer may be a dedicated target bearer that is used by an NR network side device to transmit VONR data. In the 6G network or a more advanced network in the future, the target bearer may be a corresponding dedicated target bearer used to transmit VOIP data. This is not limited herein.

607: The UE, the CPE, and the network side device transmit the VOWIFI data of the UE.

In this embodiment, the CPE transmits the VOWIFI data of the UE on the dedicated target bearer. In the data transmission process, for the CPE, the VOWIFI data of the UE may clearly include uplink VOWIFI data and downlink VOWIFI data. The process is described in detail below:

(1) When the VOWIFI data of the UE is uplink VOWIFI data, the process in which the CPE transmits the VOWIFI data of the UE on the target bearer may include: The CPE receives initial uplink VOWIFI data sent by the UE; the CPE parses the initial uplink VOWIFI data to obtain target uplink VOWIFI data; and the CPE transmits the target uplink VOWIFI data on the target bearer.

In this embodiment, the CPE deeply parses the initial uplink VOWIFI data sent by the UE, to obtain the target uplink VOWIFI data, namely, the target uplink VOWIFI data corresponding to a data format that can be transmitted on the target bearer; and then the target uplink VOWIFI data is transmitted on the target bearer. Compared with a transmission mode of directly forwarding the VOWIFI data in the conventional technology, transmitting the VOWIFI data on the target bearer can ensure quality and security of a VoWifi service.

(2) When the VOWIFI data of the UE is downlink VOWIFI data, the process in which the CPE transmits the VOWIFI data of the UE on the target bearer may include: The CPE receives, on the target bearer, initial downlink VOWIFI data sent by the network side device; the CPE parses the initial downlink VOWIFI data to obtain target downlink VOWIFI data; and the CPE sends the target downlink VOWIFI data to the UE.

In this embodiment, after the CPE receives, through the target bearer, the initial downlink VOWIFI data sent by the network side device, the CPE parses the initial downlink VOWIFI data to obtain the target downlink VOWIFI data;

and then the CPE sends the target downlink VOWIFI data to the UE. Compared with a transmission mode of directly forwarding the VOWIFI data in the conventional technology, transmitting the VOWIFI data on the target bearer can ensure quality and security of a VoWifi service.

The foregoing describes embodiments of this application from a perspective of the method. The following describes the CPE, the UE, and the network side device in embodiments of this application from a perspective of a specific apparatus implementation.

Figure 7:
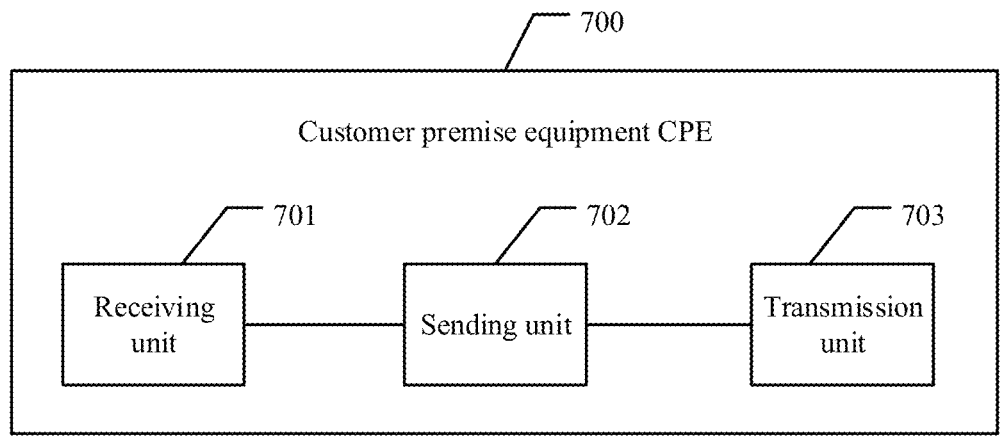
FIG. 7 is a schematic diagram of an implementation of an embodiment of CPE according to an embodiment of this application.

Refer to FIG. 7. Customer premise equipment CPE 700 according to an embodiment of this application includes:

a receiving unit 701, configured to receive a call request message from user equipment UE;

a sending unit 702, configured to send, based on the call request message, a bearer setup request message to a network side device, where the bearer setup request message indicates a request to set up a target bearer, and the target bearer is used by the UE to perform VOWIFI service communication, where the sending unit 702 is further configured to send a call response message to the UE after the CPE receives a bearer setup response message sent by the network side device; and a transmission unit 703, configured to transmit VOWIFI data of the UE on the target bearer.

In a preferred implementation, the receiving unit 701 is further configured to:

receive a registration message from the UE, where the sending unit is further configured to send a registration response message to the UE, where the registration response message includes capability information of the CPE.

In a preferred implementation, the transmission unit 703 is specifically configured to:

receive initial uplink VOWIFI data sent by the UE;

parse the initial uplink VOWIFI data, to obtain target uplink VOWIFI data; and transmit the target uplink VOWIFI data on the target bearer.

In a preferred implementation, the transmission unit 703 is specifically configured to:

receive, on the target bearer, initial downlink VOWIFI data sent by the network side device;

parse the initial downlink VOWIFI data, to obtain target downlink VOWIFI data; and send the target downlink VOWIFI data to the UE.

In addition, the customer premise equipment CPE 700 in FIG. 7 may be alternatively configured to implement:

the receiving unit 701 is configured to receive a target paging message sent by a network side device, where the target paging message includes a second identifier of UE associated with the CPE;

the sending unit 702 is configured to send a call request message to the UE if the UE is within a service scope of the CPE;

the sending unit 702 is configured to: after the CPE receives a call response message sent by the UE, send a bearer setup request message to the network side device, where the bearer setup request message indicates a request message to set up a target bearer, and the target bearer is used by the UE to perform voice over wireless fidelity VOWIFI service communication; and the transmission unit 703 is configured to transmit VOWIFI data of the UE on the target bearer.

It should be noted that content such as information exchange and an execution process between the modules of the customer premise equipment CPE 700 is similar to that in the method embodiments of this application. For specific content, refer to the descriptions in the method embodiments of this application. Details are not described herein again.

Figure 8:
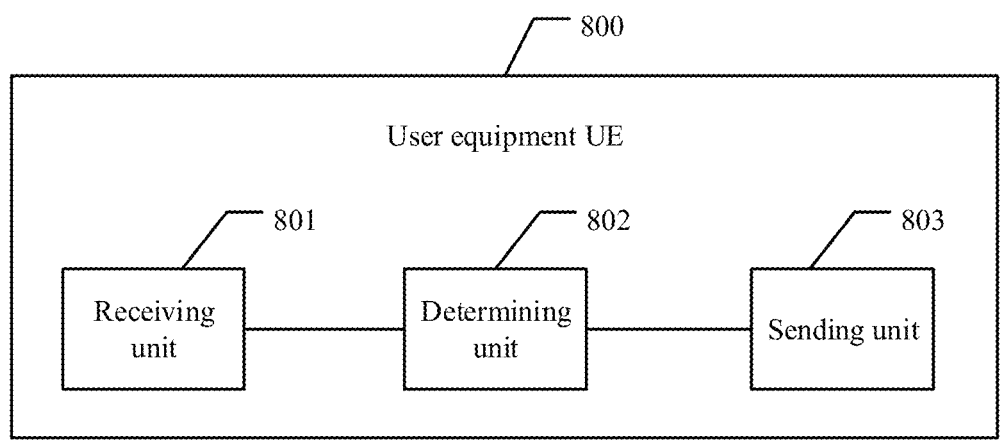
FIG. 8 is a schematic diagram of an implementation of UE according to an embodiment of this application.

Refer to FIG. 8. An embodiment of this application provides user equipment UE 800, including:

a receiving unit 801, configured to receive capability information of customer premise equipment CPE sent by the CPE;

a determining unit 802, configured to determine, based on the capability information of the CPE, whether the CPE is used to process voice over wireless fidelity VOWIFI service communication; and a sending unit 803, configured to send a call request message to the CPE when the determining unit determines that the CPE is used to process the VOWIFI service communication, where the sending unit 803 is further configured to: after the UE receives a call response message from the CPE, send VOWIFI data to the CPE.

In a preferred implementation, the capability information of the CPE includes a network support capability of the CPE, and the determining unit 802 is specifically configured to:

determine whether the network support capability of the CPE includes an internet protocol multimedia subsystem IMS voice access capability; and if yes, process, by the UE, the VOWIFI service communication by using the CPE; or if not, process, by the UE, the VOWIFI service communication without using the CPE.

In a preferred implementation, the capability information of the CPE includes an air interface channel condition of the CPE, and the determining unit 802 is specifically configured to:

determine, by the UE, whether the air interface channel condition of the CPE meets a threshold; and if yes, process, by the UE, the VOWIFI service communication by using the CPE; or if not, process, by the UE, the VOWIFI service communication without using the CPE.

In a preferred implementation, the capability information of the CPE includes an air interface channel condition of the CPE, and the determining unit 802 is specifically configured to:

determine, by the UE, whether the air interface channel condition of the CPE is superior to an air interface channel condition of a mobile data network; and if yes, process, by the UE, the VOWIFI service communication by using the CPE; or if not, process, by the UE, the VOWIFI service communication without using the CPE.

In a preferred implementation, the sending unit 803 is further configured to:

send a registration message to the CPE, where the receiving unit 801 is further configured to receive a registration response message sent by the CPE, where the registration response message includes the capability information of the CPE.

It should be noted that content such as information exchange and an execution process between the modules of the user equipment UE 800 is similar to that in the method embodiments of this application. For specific content, refer to the descriptions in the method embodiments of this application. Details are not described herein again.

Figure 9:
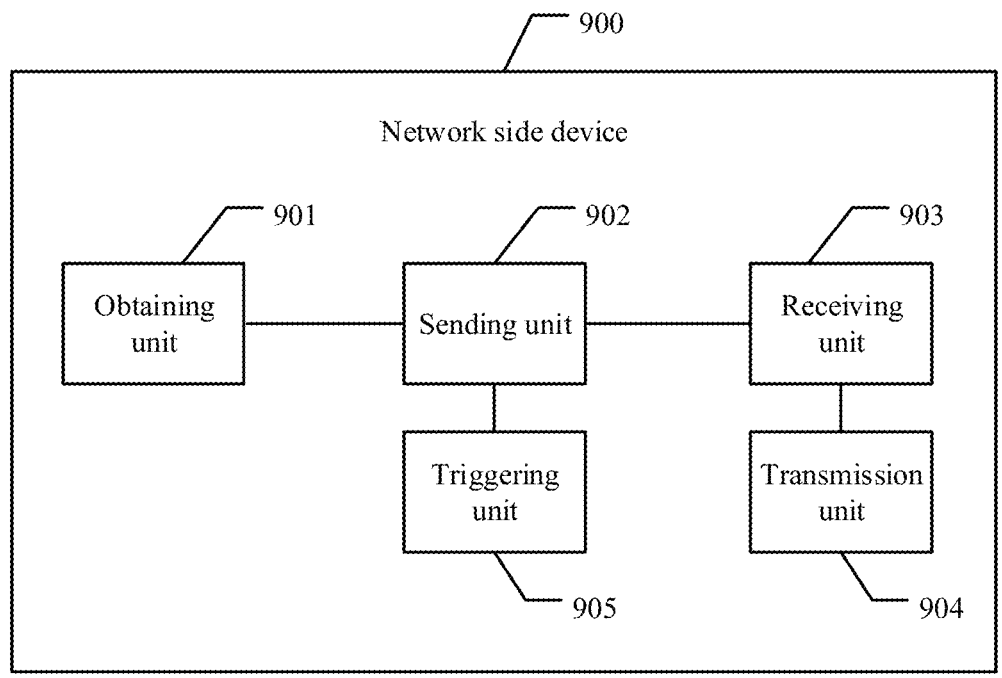
FIG. 9 is a schematic diagram of an implementation of a network side device according to an embodiment of this application.

Refer to FIG. 9. An embodiment of this application provides a network side device 900, including:

an obtaining unit 901, configured to obtain a target paging message and a first identifier of customer premise equipment CPE, where the target paging message includes a second identifier of user equipment UE associated with the CPE;

a sending unit 902, configured to send the target paging message to the CPE corresponding to the first identifier;

a receiving unit 903, configured to receive a bearer setup request message sent by the CPE, where the bearer setup request message indicates a request message to set up a target bearer, and the target bearer is used by the UE to perform voice over wireless fidelity VOWIFI service communication, where the sending unit 902 is configured to: after the target bearer is set up, send, by the network side device, a bearer setup response message to the CPE; and a transmission unit 904, configured to transmit VOWIFI data of the UE on the target bearer.

In a preferred implementation, the obtaining unit 901 is specifically configured to:

obtain a first paging message, where the first paging message includes the target paging message and the first identifier.

In a preferred implementation, the obtaining unit 901 is specifically configured to:

obtain a second paging message, where the second paging message includes the second identifier; and determine the first identifier based on the second identifier.

In a preferred implementation, the network side device further includes:

a triggering unit 905, configured to: when the network side device fails to perform paging by using the second identifier, trigger, by the network side device, execution of sending the target paging message to the CPE based on the first identifier.

It should be noted that content such as information exchange and an execution process between the modules of the network side device 900 is similar to that in the method embodiments of this application. For specific content, refer to the descriptions in the method embodiments of this application. Details are not described herein again.

Figure 10:
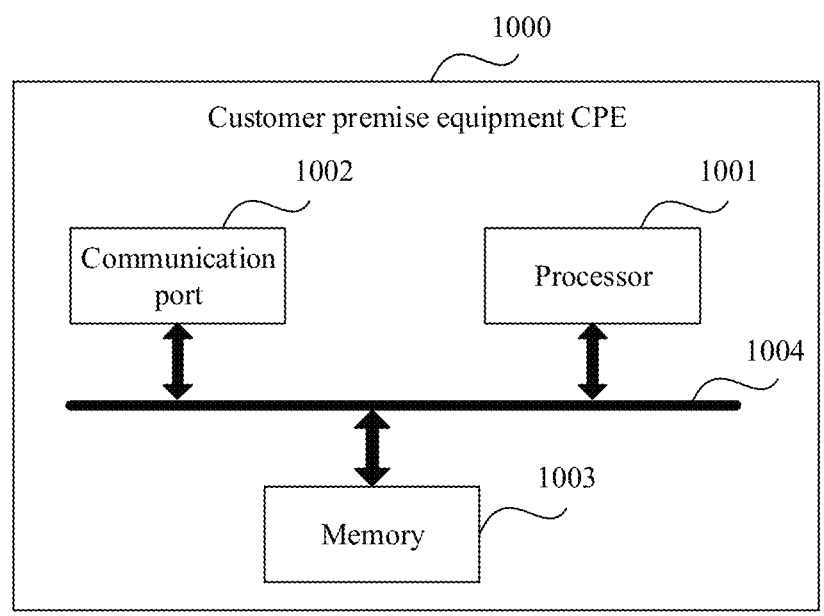
FIG. 10 is another schematic diagram of an implementation of an embodiment of CPE according to an embodiment of this application.

FIG. 10 is a possible schematic diagram of a logical structure of the customer premise equipment CPE 1000 in the foregoing embodiment according to an embodiment of this application. The CPE 1000 includes a processor 1001, a communication port 1002, a memory 1003, and a bus 1004. The processor 1001, the communication port 1002, and the memory 1003 are connected to each other by using the bus 1004. In this embodiment of this application, the processor 1001 is configured to control an action of the CPE 1000. For example, the communication port 1002 is configured to perform functions performed by the receiving unit 701, the sending unit 702, and the transmission unit 703 in FIG. 7, to support communication of the CPE 1000. The memory 1003 is configured to store program code and data that are of the CPE 1000.

The processor 1001 may be a central processing unit, a general-purpose processor, a digital signal processor, an application-specific integrated circuit, a field programmable gate array or another programmable logic device, a transistor logic device, a hardware component, or any combination thereof. The processor 1001 may implement or execute various example logical blocks, modules, and circuits described with reference to content disclosed in this application. The processor may alternatively be a combination for implementing a computing function, for example, a combination including one or more microprocessors, or a combination of a digital signal processor and a microprocessor.

The bus 1004 may be a peripheral component interconnect (PCI) bus, an extended industry standard architecture (EISA) bus, or the like. The bus may be classified into an address bus, a data bus, a control bus, and the like. For ease of representation, only one thick line is for representing the bus in FIG. 10, but this does not mean that there is only one bus or only one type of bus.

Figure 11:
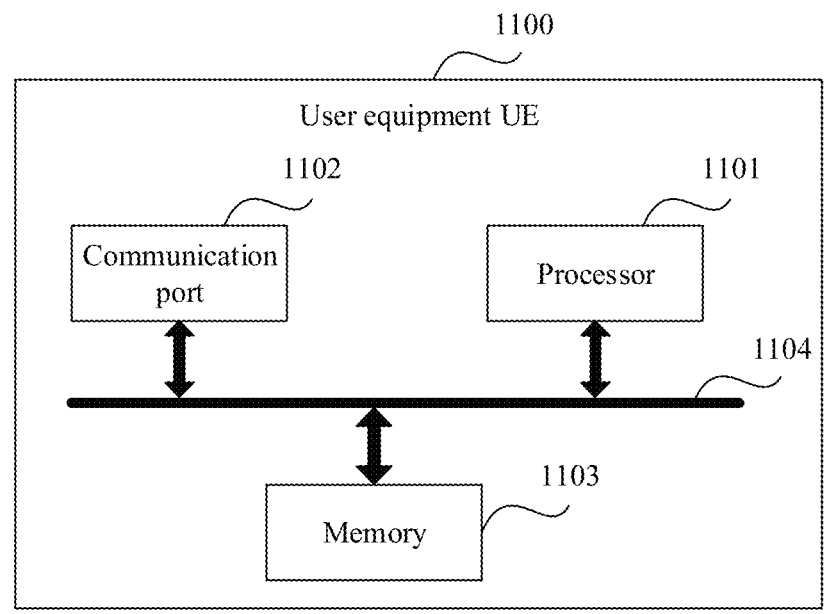
FIG. 11 is another schematic diagram of an implementation of UE according to an embodiment of this application.

FIG. 11 is a possible schematic diagram of a logical structure of the user equipment UE 1100 in the foregoing embodiment according to an embodiment of this application. The UE 1100 includes a processor 1101, a communication port 1102, a memory 1103, and a bus 1104. The processor 1101, the communication port 1102, and the memory 1103 are connected to each other by using the bus 1104. In this embodiment of this application, the processor 1101 is configured to control an action of the UE 1100. For example, the processor 1101 is configured to perform a function performed by the determining unit 802 in FIG. 8. The communication port 1102 is configured to perform functions performed by the receiving unit 801 and the sending unit 803 in FIG. 8, to support communication of the UE 1100. The memory 1103 is configured to store program code and data that are of the UE 1100.

The processor 1101 may be a central processing unit, a general-purpose processor, a digital signal processor, an application-specific integrated circuit, a field programmable gate array or another programmable logic device, a transistor logic device, a hardware component, or any combination thereof. The processor 1101 may implement or execute various example logical blocks, modules, and circuits described with reference to content disclosed in this application. The processor may alternatively be a combination for implementing a computing function, for example, a combination including one or more microprocessors, or a combination of a digital signal processor and a microprocessor. The bus 1104 may be a peripheral component interconnect (PCI) bus, an extended industry standard architecture (EISA) bus, or the like. The bus may be classified into an address bus, a data bus, a control bus, and the like. For ease of representation, only one thick line is for representing the bus in FIG. 11, but this does not mean that there is only one bus or only one type of bus.

Figure 12:
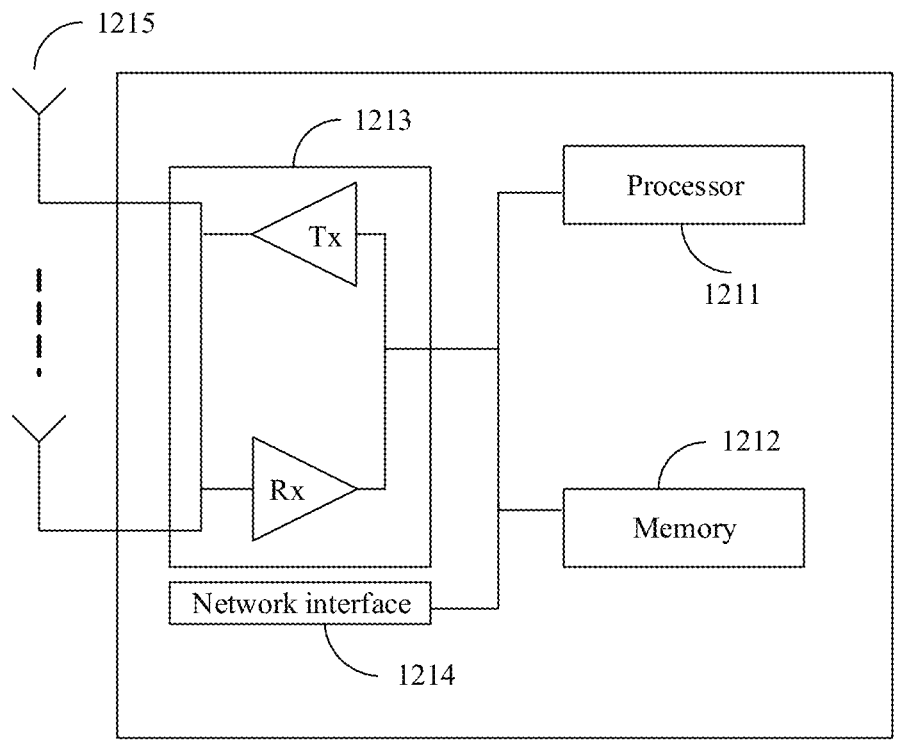
FIG. 12 is another schematic diagram of an implementation of a network side device according to an embodiment of this application.

FIG. 12 is a schematic diagram of a structure of the network side device in the foregoing embodiment according to an embodiment of this application. For a structure of the network side device, refer to the structure shown in FIG. 12.

The network side device includes at least one processor 1211, at least one memory 1212, at least one transceiver 1213, at least one network interface 1214, and one or more antennas 1215. The processor 1211, the memory 1212, the transceiver 1213, and the network interface 1214 are connected, for example, by using a bus. In this embodiment of this application, the connection may include various interfaces, transmission lines, buses, or the like. This is not limited in this embodiment. The antenna 1215 is connected to the transceiver 1213. The network interface 1214 is configured to connect the network side device to another communication device by using a communication link. For example, the network interface 1214 may include a network interface between the network side device and a core network element, for example, an S1 interface. The network interface may include a network interface between the network side device and another network device (for example, another network side device or a core network element), for example, an X2 interface or an Xn interface.

The processor 1211 is mainly configured to process a communication protocol and communication data, control the entire network side device, execute a software program, and process data of the software program, for example, configured to support the network side device in performing an action described in embodiments. The network side device may include a baseband processor and a central processing unit. The baseband processor is mainly configured to process the communication protocol and the communication data. The central processing unit is mainly configured to control the entire terminal device, execute the software program, and process the data of the software program. Functions of the baseband processor and the central processing unit may be integrated into the processor 1211 in FIG. 12. A person skilled in the art may understand that the baseband processor and the central processing unit each may be an independent processor, and are interconnected by using a technology such as a bus. A person skilled in the art can understand that the terminal device may include a plurality of baseband processors to adapt to different network standards, the terminal device may include a plurality of central processing units to enhance a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the memory in a form of a software program. The processor executes the software program to implement a baseband processing function.

The memory is mainly configured to store the software program and the data. The memory 1212 may exist independently, and is connected to the processor 1211. Optionally, the memory 1212 may alternatively be integrated with the processor 1211. For example, the memory 1212 and the processor 1211 are integrated into one chip. The memory 1212 can store program code for executing the technical solution in embodiments of this application, and the processor 1211 controls execution of the program code. Various types of executed computer program code may also be considered as drivers of the processor 1211.

FIG. 12 shows only one memory and one processor. An actual terminal device may include a plurality of processors and a plurality of memories. The memory may also be referred to as a storage medium, a storage device, or the like. The memory may be a storage element located on a same chip as the processor, namely, an on-chip storage element, or an independent storage element. This is not limited in this embodiment of this application.

The transceiver 1213 may be configured to support receiving or sending of a radio frequency signal between the network side device and a terminal, and the transceiver 1213 may be connected to the antenna 1215. The transceiver 1213 includes a transmitter Tx and a receiver Rx. Specifically, the one or more antennas 1215 may receive a radio frequency signal. The receiver Rx of the transceiver 1213 is configured to: receive the radio frequency signal from the antenna, convert the radio frequency signal into a digital baseband signal or a digital intermediate frequency signal, and provide the digital baseband signal or the digital intermediate frequency signal for the processor 1211, so that the processor 1211 further processes the digital baseband signal or the digital intermediate frequency signal, for example, performs demodulation processing and decoding processing. In addition, the transmitter Tx of the transceiver 1213 is further configured to: receive a modulated digital baseband signal or digital intermediate frequency signal from the processor 1211, convert the modulated digital baseband signal or digital intermediate frequency signal into a radio frequency signal, and send the radio frequency signal through the one or more antennas 1215. Specifically, the receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as digital signals.

The transceiver may also be referred to as a transceiver unit, a transceiver, a transceiver apparatus, or the like. Optionally, a component that is in the transceiver unit and that is configured to implement a receiving function may be considered as a receiving unit. A component that is in the transceiver unit and that is configured to implement a sending function may be considered as a sending unit. That is, the transceiver unit includes the receiving unit and the sending unit. The receiving unit may also be referred to as a receiver, an input port, a receiver circuit, or the like. The sending unit may be referred to as a transmitter machine, a transmitter, a transmitter circuit, or the like.

An embodiment of this application further provides a communication system. The communication system includes the foregoing customer premise equipment CPE, the foregoing user equipment UE, and the foregoing network side device.

An embodiment of this application further provides a computer-readable storage medium. The computer-readable storage medium stores a function used to implement the method in any possible implementation of the foregoing customer premise equipment CPE, or stores a program or instructions used to implement the method in any possible implementation of the foregoing user equipment UE, or stores a program or instructions used to implement the method in any possible implementation of the foregoing network side device.

An embodiment of this application further provides a computer program product. The program product includes a program. When the program is run, the method in any possible implementation of the foregoing customer premise equipment CPE, the method in any possible implementation of the foregoing user equipment UE, or the method in any possible implementation of the foregoing network side device is performed.

An embodiment of this application further provides a chip system. The chip system includes a processor, configured to support customer premise equipment CPE in implementing a function in any possible implementation of the foregoing CPE. In a possible design, the chip system may further include a memory, and the memory is configured to store program instructions and data that are necessary for a core network element. The chip system may include a chip, or may include the chip and another discrete component.

An embodiment of this application further provides a chip system. The chip system includes a processor, configured to support user equipment UE in implementing a function in any possible implementation of the UE. In a possible design, the chip system may further include a memory, and the memory is configured to store program instructions and data that are necessary for a core network element. The chip system may include a chip, or may include the chip and another discrete component.

An embodiment of this application further provides a chip system. The chip system includes a processor, configured to support a network side device in implementing a function in any possible implementation of the foregoing network side device. In a possible design, the chip system may further include a memory, and the memory is configured to store program instructions and data that are necessary for a core network element. The chip system may include a chip, or may include the chip and another discrete component.

It can be clearly understood by persons skilled in the art that, for a purpose of convenient and brief description, for detailed working processes of the foregoing system, apparatus, and unit, refer to corresponding processes in the foregoing method embodiments. Details are not described herein.

In the several embodiments provided in this application, it should be understood that the disclosed system, apparatus, and method may be implemented in other manners. For example, the described apparatus embodiments are merely examples. For example, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one place, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes various media that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A communication device, which is customer premise equipment (CPE) or an apparatus included in the CPE, comprising:
   at least one processor; and
   one or more memories coupled to the at least one processor and storing programming instructions for execution by the at least one processor to perform operations comprising:
   sending capability information of customer premise equipment (CPE) to user equipment (UE), wherein the capability information of the CPE is used by the UE for determining whether the CPE is for processing voice over wireless fidelity (VOWIFI) service communication;
   receiving a call request message from the UE;
   sending, based on the call request message, a bearer setup request message to a network side device, wherein the bearer setup request message indicates a request to set up a target bearer—for VOWIFI service communication;
   after receiving a bearer setup response message from the network side device, sending a call response message to the UE;
   receiving initial uplink VOWIFI data from the UE;
   parsing the initial uplink VOWIFI data to obtain target uplink VOWIFI data; and
   transmitting the target uplink VOWIFI data of the UE on the target bearer.

2. The communication device according to claim 1, wherein the operations further comprise:
   receiving a registration message from the UE; and
   sending a registration response message to the UE, wherein the registration response message comprises capability information of the CPE.

3. The communication device according to claim 1, wherein the operations further comprise:
   receiving, on the target bearer, initial downlink VOWIFI data from the network side device;
   parsing the initial downlink VOWIFI data to obtain target downlink VOWIFI data; and
   sending the target downlink VOWIFI data to the UE.

4. The communication device according to claim 1, wherein the operations further comprise:
   receiving a target paging message from the network side device, wherein the target paging message comprises a second identifier of UE associated with the CPE;
   when the UE is within a service scope of the CPE, sending a call request message to the UE;
   after receiving a call response message from the UE, sending a bearer setup request message to the network side device, wherein the bearer setup request message indicates a request message to set up the target bearer, and the target bearer is for VOWIFI service communication; and
   transmitting VOWIFI data of the UE on the target bearer.

5. A communication device, which is user equipment (UE) or an apparatus included in the UE, comprising:
- at least one processor; and
- one or more memories coupled to the at least one processor and storing programming instructions for execution by the at least one processor to perform operations comprising:
- receiving capability information of customer premise equipment (CPE) from the CPE, wherein the capability information of the CPE comprises a network support capability of the CPE;
- determining, based on the capability information of the CPE, whether the CPE is for processing voice over wireless fidelity (VOWIFI) service communication, wherein when the network support capability of the CPE comprises an internet protocol multimedia subsystem (IMS) voice access capability, the CPE is for processing the VOWIFI service communication, and when the network support capability of the CPE does not comprise the IMS voice access capability, the CPE is not for processing the VOWIFI service communication;
- when the CPE is for processing the VOWIFI service communication, sending a call request message to the CPE; and
- after receiving a call response message from the CPE, sending VOWIFI data to the CPE.

6. The communication device according to claim 5, wherein the capability information of the CPE comprises an air interface channel condition of the CPE, and the operations further comprise:
- determining whether the air interface channel condition of the CPE meets a threshold; and
- when the air interface channel condition of the CPE meets the threshold, processing the VOWIFI service communication by using the CPE; or
- when the air interface channel condition of the CPE does not meet the threshold, processing the VOWIFI service communication without using the CPE.

7. The communication device according to claim 5, wherein the capability information of the CPE comprises an air interface channel condition of the CPE, and the operations further comprise:
- determining whether the air interface channel condition of the CPE is superior to an air interface channel condition of a mobile data network; and
- when the air interface channel condition of the CPE is superior to the air interface channel condition of the mobile data network, processing the VOWIFI service communication by using the CPE; or
- when the air interface channel condition of the CPE is not superior to the air interface channel condition of the mobile data network, processing the VOWIFI service communication without using the CPE.

8. The communication device according to claim 5, wherein the operations further comprise:
- sending a registration message to the CPE; and
- receiving a registration response message from the CPE, wherein the registration response message comprises the capability information of the CPE.

9. A communication device, which is a network side device or an apparatus included in the network side device, comprising:
- at least one processor; and
- one or more memories coupled to the at least one processor and storing programming instructions for execution by the at least one processor to perform operations comprising:
- obtaining a first paging message, wherein the first paging message comprises a target paging message and a first identifier of customer premise equipment (CPE), wherein the target paging message comprises a second identifier of user equipment (UE) associated with the CPE;
- sending the target paging message to the CPE corresponding to the first identifier;
- receiving a bearer setup request message from the CPE, wherein the bearer setup request message indicates a request message to set up a target bearer, and the target bearer is for voice over wireless fidelity (VOWIFI) service communication;
- after the target bearer is set up, sending a bearer setup response message to the CPE; and
- transmitting VOWIFI data of the UE on the target bearer.

10. The communication device according to claim 9, wherein the operations further comprise:
- obtaining a second paging message, wherein the second paging message comprises the second identifier; and
- determining the first identifier based on the second identifier.

11. The communication device according to claim 9, wherein the operations further comprise:
- when the network side device fails to perform paging by using the second identifier, triggering execution of sending the target paging message to the CPE based on the first identifier.

* * * * *